US010865748B2

(12) United States Patent
Kwak et al.

(10) Patent No.: US 10,865,748 B2
(45) Date of Patent: Dec. 15, 2020

(54) ADAPTER FILTER FIXING TYPE AIR CLEANER AND INTAKE SYSTEM INCLUDING THE SAME

(71) Applicants: Hyundai Motor Company, Seoul (KR); Kia Motors Corporation, Seoul (KR)

(72) Inventors: Seong-Youn Kwak, Gyeonggi-do (KR); Won-Seop Choi, Gyeonggi-do (KR); Ju-Ho Han, Gwangju (KR); Yong-Gyo Seo, Gyeonggi-do (KR); Sung-Hyuk Yoon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 78 days.

(21) Appl. No.: 15/990,045

(22) Filed: May 25, 2018

(65) Prior Publication Data

US 2019/0078539 A1 Mar. 14, 2019

(30) Foreign Application Priority Data

Sep. 14, 2017 (KR) ........................ 10-2017-0118014

(51) Int. Cl.
*F02M 35/024* (2006.01)
*B01D 46/00* (2006.01)
(Continued)

(52) U.S. Cl.
CPC ... *F02M 35/02416* (2013.01); *B01D 46/0005* (2013.01); *B01D 46/2403* (2013.01); *B01D 46/2411* (2013.01); *F02M 35/02441* (2013.01); *F02M 35/02483* (2013.01); *F02M 35/04* (2013.01); *B01D 2265/05* (2013.01); *B01D 2277/20* (2013.01); *B01D 2279/60* (2013.01)

(58) Field of Classification Search
CPC ............. F02M 35/04; F02M 35/02433; F02M 35/02425; F02M 35/02416; B01D 2277/20; B01D 2277/00; B01D 2279/00; B01D 2279/60; B01D 46/2411; B01D 46/0002; B01D 46/0005; B01D 35/306
See application file for complete search history.

(56) References Cited

U.S. PATENT DOCUMENTS 5,120,334 A * 6/1992 Cooper ................. F02B 61/045 123/198 E
7,150,260 B2 * 12/2006 Arevalo ............... F02M 35/024 123/198 E
2016/0245242 A1 * 8/2016 Mahmood ........ F02M 35/02416

FOREIGN PATENT DOCUMENTS

JP 2001293310 A 10/2001

* cited by examiner

*Primary Examiner* — Lindsay M Low
*Assistant Examiner* — Ruben Picon-Feliciano
(74) *Attorney, Agent, or Firm* — Mintz Levin Cohn Ferris Glovsky and Popeo, P.C.; Peter F. Corless

(57) ABSTRACT

An air cleaner is provided. The air cleaner includes an air cleaner body and air cleaner cover that are coupled to each other to form an internal space for mounting a filter and that are clamped and separated through a cover clamp. The filter purifies air that is introduced through a duct inlet into air which is to be discharged through a hose outlet. A filter fixer is formed in the internal space to seat the filter and forms a filter holding force to block swaying of the filter. Additionally, a filter adapter is mounted into or detached from the internal space and is inserted into the internal space to form a filter fixing force for fixing the filter.

17 Claims, 13 Drawing Sheets

(51) Int. Cl.
*B01D 46/24* (2006.01)
*F02M 35/04* (2006.01)

ADAPTER FILTER FIXING TYPE AIR CLEANER AND INTAKE SYSTEM INCLUDING THE SAME

CROSS-REFERENCE(S) TO RELATED APPLICATIONS

This application claims priority to Korean Patent Application No. 10-2017-0118014, filed on Sep. 14, 2017, which is incorporated herein by reference in its entirety.

BACKGROUND

Field of the Invention

The present invention relates to an air cleaner, and more particularly, to an intake system that includes an air cleaner which has a circular filter based on a filter fixing structure using an adapter, and is suitable for a high performance vehicle without a bolt or spring.

Description of Related Art

In general, an intake system of a vehicle changes outside air into clean air using an air cleaner having a circular filter embedded therein, and supplies the clean air to an engine, the circular filter filtering foreign matters contained in the outside air. For this operation, a filter replacement type air cleaner of which a contaminated circular filter can be replaced with a new circular filter may be applied as the air cleaner. The filter replacement type air cleaner may include a bolt fixing type air cleaner with a bolt fastening structure and a spring fixing type air cleaner with a spring support structure.

According to the bolt fastening type air cleaner, a circular filter housed in an air cleaner body is positioned on a bolting seating surface of the air cleaner body with a separate adapter, and then assembled by bolt-fastening. During a replacement operation, an air cleaner cover is separated, and the bolt and the adapter are removed to separate the circular filter. Further, according to the spring fixing type air cleaner, a filter fixing part of a circular filter pushed into an air cleaner body through an air cleaner cover is fastened to a spring coupled to a spring attachment part formed in the air cleaner body to assemble a circular filter. During a replacement operation, the air cleaner cover is separated, and the spring fastening is released to separate the circular filter.

Therefore, the contaminated filter having a low purification rate in the air clear is capable of being replaced with a new filter having a high purification rate, and the intake system may supply clean air to the engine through the optimal air purification performance of the air cleaner. However, since the bolt fixing type air cleaner additionally requires the adapter and the bolting structure, the structure of the air cleaner may become complex, while a mold cost is increased. Furthermore, the adapter and the bolting structure may increase the number of parts and the overall manufacturing cost. In particular, when the circular filter is assembled and separated, bolts and nuts need to be tightened after the adapter is coupled. Therefore, the number of repair processes increases, and the workability may be degraded during a repair and replacement operation.

Furthermore, since the spring fixing type air cleaner additionally requires the spring support structure, the structure of a mold may become complex, while a mold cost is increased. The addition of the spring support structure and separate structures at the circular filter may increase the overall manufacturing cost and the weight of the air cleaner. In particular, the spring fastening structure may cause difficulty in a repair operation since the spring fastening structure is positioned deep in the air cleaner body.

For a square filter type air cleaner, a filter replacement method using a clamp structure is applied. According to the clamp structure, a seating surface of the rectangular filter housed in an air cleaner body is pressed by an air cleaner cover, and the rectangular filter is assembled by clamp fastening. During a replacement operation, the air cleaner cover is removed, and the clamp fastening is released to separate the rectangular filter. Therefore, the square filter type air cleaner provides convenience through the clamp structure during the filter replacement operation. However, since the square filter type air cleaner has a smaller penetration area and lower suction pressure than the circular filter air cleaner, the square filter type air cleaner has a limitation in being unable to meet requirements for an air cleaner suitable for an intake system of a high-performance vehicle. Therefore, a circular filter type air cleaner suitable for an intake system of a high-performance vehicle is required to have a convenient filter replacement method using the clamp structure.

SUMMARY

One aspect of the present invention provides an adapter filter fixing type air cleaner which forms a filter fixing force by inserting a filter adapter into an air cleaner body having a filter embedded therein, the filter being inclined through a filter holding force, such that the filter may be repaired more easily, and an intake system including the same.

Another aspect of the present invention provides an adapter filter fixing type air cleaner which maintains the stability of a circular filter through a filter holding force and a filter fixing force without a bolt or spring. The circular filter satisfying the requirements for a high performance vehicle through a large penetration area and high pressure absorption performance, thereby simplifying the structure and reducing the weight, mold cost and manufacturing cost, and an intake system including the same.

Other objects and advantages of the present invention may be understood by the following description, and become apparent with reference to the exemplary embodiments of the present invention. Also, it is obvious to those skilled in the art to which the present invention pertains that the objects and advantages of the present invention may be realized by the means as claimed and combinations thereof.

In accordance with an exemplary embodiment of the present invention, an air cleaner may include an air cleaner body and air cleaner cover coupled to each other to form an internal space for mounting a filter, and clamped and separated through a cover clamp, the filter configured to purify air introduced through a duct inlet into air which is to be discharged through a hose outlet; a filter fixer formed in the internal space to seat the filter, and forming a filter holding force to block swaying of the filter; and a filter adapter mounted into or detached from the internal space, and inserted into the internal space to form a filter fixing force for fixing the filter.

The filter may include a circular filter having a cylindrical frame structure formed of hard urethane. The filter adapter may be mounted into or separated from the internal space of the air cleaner body from which the air cleaner cover is separated. The filter adapter may be formed in a wedge shape to form the filter fixing force for pressing the filter. The filter may be positioned in the internal space while having an upward inclination arrangement in which a front side thereof at the hose outlet is raised and a rear side thereof is lowered, the filter fixer may support the filter through the filter holding force to maintain the upward inclination arrangement, and the filter adapter may form the filter fixing force at the rear of the filter.

Further, the filter fixer may include: an adapter guide member formed at the rear of the filter to guide an insertion path of the filter adapter; and a filter holding member formed at the front and rear sides and the left and right sides of the filter to form the filter holding force. The filter adapter may be fitted to the adapter guide member and form the filter fixing force. The filter holding member may include a filter support member positioned at the rear of the filter, a filter seating member positioned at the front of the filter, a filter positioning member positioned at the left and right of the filter, and a filter pushing member that forms the filter holding force at the top of the filter. The filter support member, the filter seating member and the filter positioning member may be formed in the air cleaner body, and the filter pushing member may be formed in the air cleaner cover.

The filter support member may protrude from the bottom surface of the internal space, the filter seating member may protrude from the inner wall of the internal space, the filter support member and the filter seating member may support the rear and front sides of the filter in the upward inclination arrangement, the filter positioning member may support the left and right sides of the filter in the upward inclination arrangement, using left and right filter holders protruding from the inner wall of the internal space to face each other, and the filter pushing member may push the upper portion of the filter adapter fitted to the adapter guide member through an adapter pusher, and push the upper portion of the filter at the front of the filter using a filter pusher that protrudes to face the adapter pusher.

The filter adapter may include: an adapter body fitted into the adapter guide member and forming the filter fixing force to press the rear surface of the filter; a filter fixing rib that protrudes from the adapter body, and fitted into the adapter guide member to be in contact with the rear surface of the filter; and left and right insertion protrusions that protrude from the adapter body with a space provided therebetween, and inserted into left and right insertion channels of the adapter guide member to hold the position of the adapter body.

A filter flange may protrude from the inner wall of the internal space at a connection between the filter and the hose outlet to connect the filter, and a filter strap may be fitted to the filter flange to seal the filter flange. A housing strap may seal the coupling surface between the air cleaner body and the air cleaner body to seal the internal space, and the coupling surface may include strap channels to which the housing strap may be fitted. The air cleaner body may include a hose housing and duct housing welded to form the internal space, the hose housing may have the hose outlet and may be coupled to the air cleaner cover, and the duct housing may have the duct inlet and a bottom surface.

In accordance with another exemplary embodiment of the present invention, an intake system may include: an air cleaner that has an air cleaner body with a hose housing and duct housing which are coupled to form an internal space, wherein the hose housing includes a hose outlet from which clean air is discharged and the duct housing includes a duct inlet into which outside air is introduced; an air cleaner cover coupled to the hose housing to form the internal space; a cylindrical filter mounted in the internal space while having an upward inclination arrangement in which a front side thereof is raised and a rear side thereof is lowered, and changing the outside air into the clean air by filtering foreign matters of the outside air; a filter fixer that forms a filter holding force to support the filter; a filter adapter that forms a filter fixing force to fix the filter; a housing strap installed on a coupling surface between the air cleaner body and the air cleaner cover to seal the internal space; a cover clamp clamping the air cleaner body and the air cleaner cover to each other; a filter strap installed at a connection between the filter and the hose housing to seal the filter; an intake duct through which the outside air flows; and an intake shield filtering foreign matters in the outside air flowing through the intake duct; and an intake hose through which the clean air flows.

Additionally, the intake duct may include a duct body through which the outside air flows, the duct body having a connection hook and fixing hook from which the outside air escapes, the connection hook may be fitted to a connecting connector that surrounds the duct inlet and fix a connection between the intake duct and the duct housing, and the fixing hook may be fitted to a position protrusion formed on the hose housing and fix a connection between the intake duct and the hose housing.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
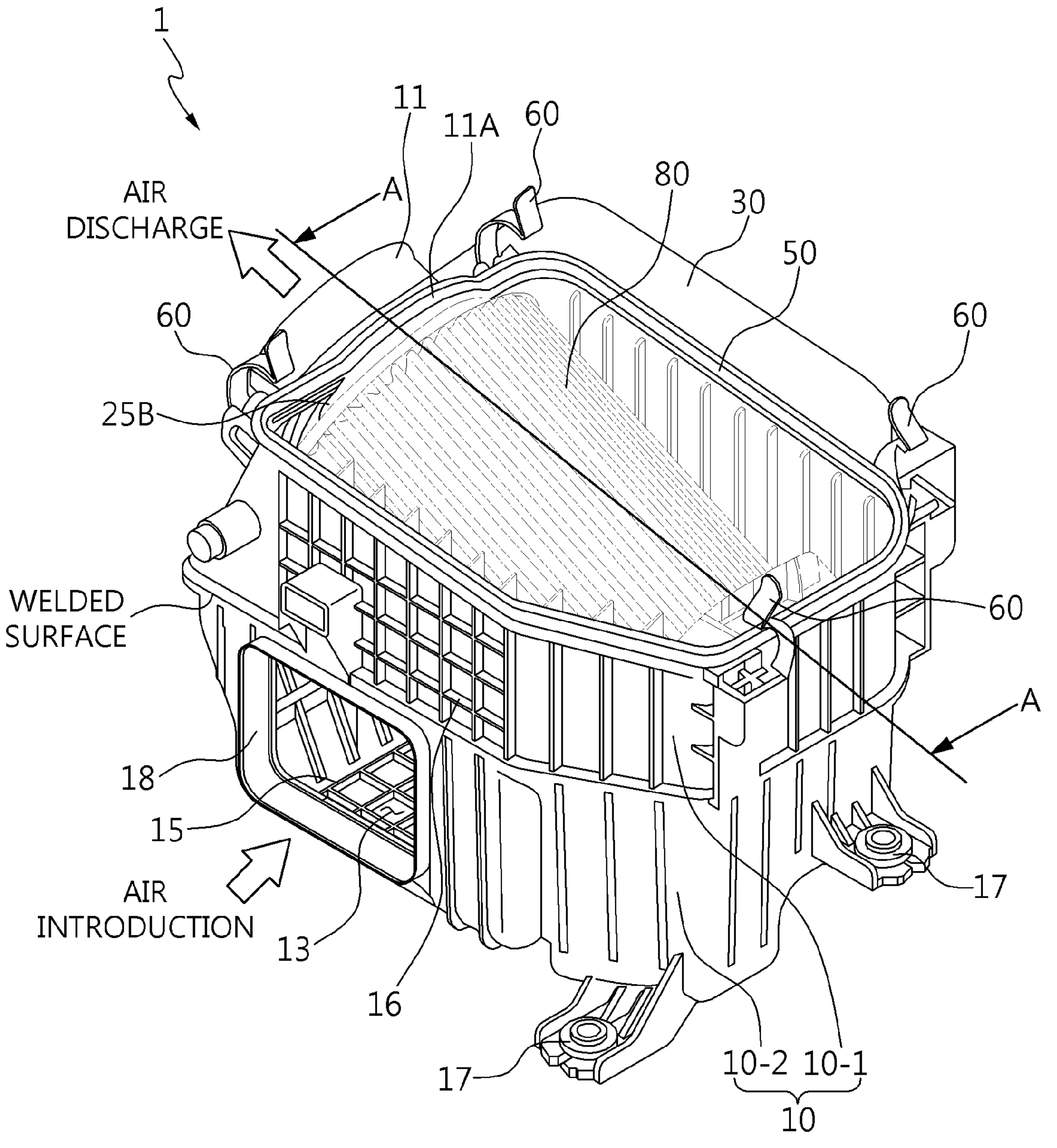
FIG. 1 is a configuration diagram of an adapter filter fixing type air cleaner in accordance with an exemplary embodiment of the present invention.
Figure 2:
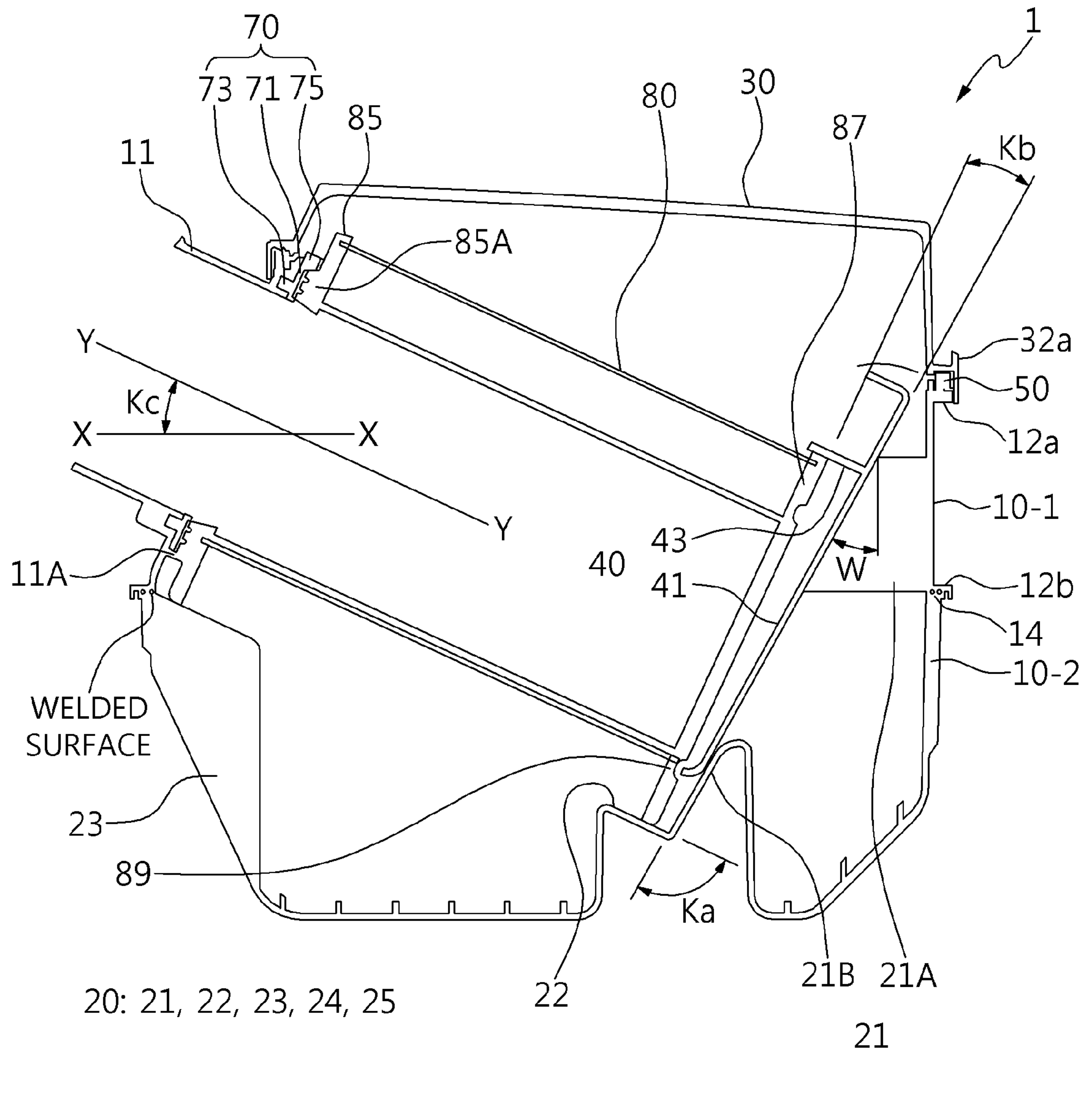
FIG. 2 is a cross-sectional view of the air cleaner in accordance with the exemplary embodiment of the present invention, taken along the line A-A of FIG. 1.

FIG. 1 is a perspective view of an air cleaner 1 in accordance with an exemplary embodiment of the present invention, and FIG. 2 is a cross-sectional view taken along the line A-A of FIG. 1. Referring to FIGS. 1 and 2, the air cleaner 1 may include an air cleaner body 10, a filter fixer 20, an air cleaner cover 30, a filter adapter 40, a housing strap 50, a cover clamp 60, a filter strap 70, and a filter 80.

In particular, the air cleaner 1 may have a rectangular box shape in which the air cleaner body 10 and the air cleaner cover 30 are fixed and coupled to each other by the cover clamp 60. The housing strap 50 of the air cleaner 1 seals an internal space (e.g., cavity) formed by the air cleaner body 10 and the air cleaner cover 30, and the filter strap 70 seals a space around the filter 80.

In addition, the air cleaner 1 may be an adapter filter fixing type air cleaner which forms a filter that holds force through a holding structure of the filter fixer 20 for the filter 80 housed in the internal space of the air cleaner body 10 and the air cleaner cover 30, and forms a filter fixing force through a fitting structure of the filter adapter 40. Furthermore, since the filter 80 applied to the air cleaner 1 may be formed of hard urethane, the filter 80 may maintain rigidity through a frame structure formed of hard urethane, and exhibit sealing performance like plastics. The frame structure may include front and rear fixing flanges 85 and 87 of FIG. 8.

Referring to the exterior of the air cleaner in FIG. 1, the air cleaner body 10 and the air cleaner cover 30 form the internal space for housing the filter 80, the housing strap 50 may be installed between the air cleaner body 10 and the air cleaner cover 30 which are coupled to each other, and the cover clamp 60 may be installed on the air cleaner body 10 and pulled to fix or separate the air cleaner cover 30. Specifically, the air cleaner body 10 may be divided into a frame-shaped hose housing 10-1 and a container-shaped duct housing 10-2, and the hose housing 10-1 and the duct housing 10-2 may be welded and integrated with each other to form an internal space (e.g., a cavity) with a bottom surface, in which the filter 80 may be housed. The welding may include ultrasonic welding.

For example, the hose housing 10-1 may have a hose outlet 11 through which air passed through the filter 80 escapes to the outside from the internal space of the air cleaner 1, the hose outlet 11 that protrudes to the outside of the hose housing 10-1. The duct housing 10-2 may have a duct inlet 13 through which air is introduced into the internal space of the air cleaner 1 from outside, the duct inlet 13 being formed by cutting the duct housing 10-2 in a rectangular shape having a predetermined size. In particular, the hose housing 10-1 may have a filter flange 11A that protrudes to the inside of the hose housing 10-1 from the hose outlet 11, and thus, the filter 80 may be positioned at the hose outlet 11, and the duct housing 10-2 may have two or more mounting bosses 17 fastened to an external structure (e.g., engine room body) and that protrude to the outside of the duct housing 10-2.

The hose housing 10-1 may include a plurality of outer ribs 16 formed on the outer surface thereof, and the duct housing 10-2 may include a plurality of inner ribs 15 formed on the inner surface thereof, to strengthen the stiffness of the housings. In particular, the hose housing 10-1 may include a fixing connector 19 that protrudes to the outside of the hose housing 10-1 to be fixed to an external structure (e.g., intake duct), and installed above the duct inlet 13, and the duct housing 10-2 may include a connecting connector 18 that protrudes to the outside of the duct housing 10-2 to surround the duct inlet in a rectangular shape, and connected to an external structure (e.g., intake duct).

The air cleaner cover 30 may be formed in a container shape to contain the upper portion of the filter 80 raised toward the hose outlet 11 of the air cleaner body 10. With the air cleaner cover 30 coupled to the hose housing 10-1 of the air cleaner body 10, a filter pusher 25B may protrude toward the upper portion of the filter 80 and press the upper portion of the filter 80. The housing strap 50 may be formed of an elastic material (e.g., rubber), and installed on a coupling surface between the hose outlet 11 of the air cleaner body 10 and the air cleaner cover 30. The housing strap 50 may be compressively deformed by a pressing force of the cover clamp 60, and seals the coupling surface to block water or foreign water from permeating into the internal space. The cover clamp 60 may be hinge-coupled to the air cleaner body 10 and pulled to fix or separate the air cleaner cover 30. In the present exemplary embodiment, four cover clamps 60 may be installed.

FIG. 2 illustrates a housing connection structure of the hose housing 10-1, the duct housing 10-2 and the air cleaner cover 30 and a filter connection structure of the filter fixer 20 and the filter adapter 40 for the filter 80. In the housing connection structure, the hose housing 10-1 may be coupled to a strap flange 32*a* of the air cleaner cover 30 via a strap flange 12*a* of the housing body that forms the internal space, and welded to a welding edge 14 of the duct housing 10-2 by a welding flange 12*b*. For this structure, the strap flange 12*a* may be formed on the upper edge of the housing body of the hose housing 10-1, connected to the strap flange 32*a* of the air cleaner cover 30, and the welding flange 12*b* may be formed on the lower edge of the housing body welded to the welding edge 14 of the duct housing 10-2.

In the filter connection structure, the filter 80 may be coupled to a filter flange 11A of the hose housing 10-1 with the filter strap 70, and assembled at an acute filter assembling angle Kc into the air cleaner 1. In particular, the filter assembling angle Kc achieves an upward inclination arrangement in which a front fixing flange 85 of the filter 80 at the filter flange 11A is raised, and a rear fixing flange 87 of the filter 80 is lowered. In FIG. 2, y-y indicates a filter virtual axial line that connects the centers of circular cross-sections of the filter 80, and x-x indicates a virtual horizontal line with respect to y-y.

The front and rear sides, the top and bottom sides, and the left and right side of the filter 80 are defined as follows. The hose outlet 11 of the hose housing 10-1 in the full length direction (axial direction) of the filter 80 is set to the front side of the filter 80, a portion to which a pressing force of the filter adapter 40 is applied is set to the rear side of the filter 80, a first side of the filter 80 in the full length direction is set to the left side, a second side of the filter 80 in the full length direction is set to the right side, a portion where the cross-section of the filter 80 in FIG. 2 is in contact with the air cleaner cover 30 is set to the top side, and a portion where the cross-section of the filter 80 is in contact with the air cleaner body 10 is set to the bottom side.

Furthermore, the filter fixer 20 forms a filter holding force for the front and rear fixing flanges 85 and 87 and the left and right surfaces of the filter frame 83 of the filter 80 through a binding structure that may include an adapter guide member 21 configured to guide the filter adapter 40 and filter holding members positioned at the front and rear sides and the left and right sides of the filter 80. In particular, the filter holding members may include a filter support member 22, a filter seating member 23, a filter positioning member 24 and a filter pushing member 25. The filter adapter 40 may be inserted into the adapter guide member 21 that forms an acute adapter guide angle W, and positioned at the rear fixing flange 87 of the filter 80. The filter adapter 40 may include a wedge-shaped adapter body 41 having an acute filter wedge angle Kb. With the adapter body 41 positioned perpendicular to a filter support angle Ka of the filter support member 22, the filter adapter 40 forms a filter fixing force by pressing the rear fixing flange 87.

Particularly, the filter support angle Ka may connect the filter support member 22 and the filter seating member 23 on the same line and form a right angle with the filter adapter 40 while forming an obtuse angle with the filter support member 22 and the adapter guide member 21. Therefore, the filter support angle Ka allows the filter support member 22 to support the rear fixing flange 87 of the filter 80 at a right angle, and allows the filter seating member 23 to support the front fixing flange 85 of the filter 80 at a right angle, thereby more stably maintaining the filter 80 which is inclined at the filter assembling angle Kc and assembled to the air cleaner 1. Furthermore, the left and right side surfaces of the filter 80 may be fixed through a filter holding force formed by the filter positioning member 24 positioned at the left and right surfaces of the filter frame 83. The adapter guide angle W may facilitate the insertion and separation operation for the filter adapter 40, and more stably maintain the insertion of the filter adapter 40. The filter wedge angle Kb causes the filter 80 to press between the adapter guide member 21 and the rear fixing flange 87.

Figure 3:
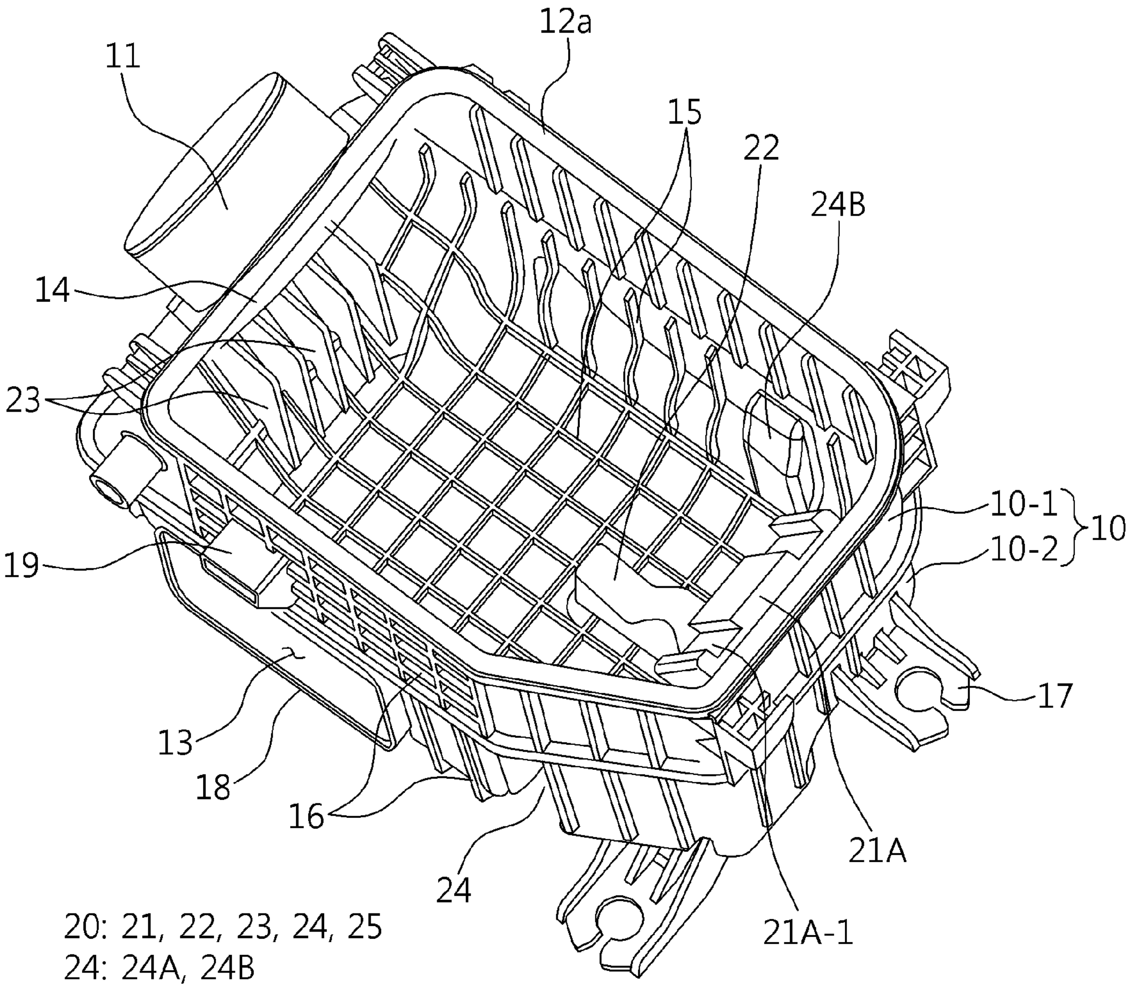
FIG. 3 is a configuration diagram illustrating an air cleaner body of the air cleaner in accordance with the exemplary embodiment of the present invention.

FIG. 3 is a perspective view illustrating that the hose housing 10-1 and the duct housing 10-2 are welded to each other, showing the detailed structures of the adapter guide member 21, the filter support member 22, the filter seating member 23 and the filter positioning member 24. In particular, the adapter guide member 21 may include an adapter guider 21A that protrudes from the inner wall of the hose housing 10-1 to form an inclined surface and an adapter supporter 21B that protrudes upward from the bottom surface of the duct housing 10-2 to form an inclined surface. The adapter guider 21A and the adapter supporter 21B may be separated from each other. Additionally, the adapter guider 21A may include a left insertion channel 21A-1 formed in the left of the inclined surface and a right insertion channel 21A-2 formed in the right of the inclined surface, and the left and right insertion channels 21A-1 and 21A-2 may be coupled to left and right insertion protrusions 45A and 45B of the adapter body 41 (refer to FIGS. 5A-5B), and thus, the insertion position and direction of the filter adapter 40 may be controlled.

In particular, an inclined surface virtual line that connects the inclined surfaces of the adapter guider 21A and the adapter supporter 21B forms the adapter guide angle W to push the filter adapter 40 along the adapter guider 21A of the hose housing 10-1 and to position the filter adapter 40 on the adapter supporter 21B of the duct housing 10-2. The inclined surface virtual line formed at the adapter guide angle W forms an insertion space at an adapter insertion angle with the rear fixing flange 87 of the filter 80 which is supported at a right angle on the filter support member 22, and the adapter insertion angle is set to a slightly smaller angle than the filter wedge angle Kb to allow a filter fixing force to be formed by pressing the adapter body 41 against the rear fixing flange 87 of the filter 80 when the filter adapter 40 is inserted. Therefore, the adapter guider 21A and the adapter supporter 21B may guide the insertion path of the filter adapter 40 to the adapter supporter 21B from the adapter guider 21A along the virtual line forming the adapter guide angle W, thereby facilitating the insertion and separation of the filter adapter 40.

The filter support member 22 may support the rear fixing flange 87 of the filter 80 at a right angle on the bottom surface of the duct housing 10-2, and the filter seating member 23 may protrude laterally from the inner wall of the duct housing 10-2 and support the front fixing flange 85 of the filter 80 at a right angle. Thus, the state in which the filter 80 is inclined at the filter assembling angle Kc and assembled to the air cleaner 1 may be maintained more stably. In particular, the filter support member 22 may be formed at an intermediate position in the widthwise direction of the duck housing 10-2, and integrated with the adapter supporter 21B and the bottom surface of the duct housing 10-2.

Moreover, the filter support member 22 may be formed in the horizontal direction with respect to the adapter supporter 21B formed in the vertical direction, and thus, the filter support angle Ka is formed as an obtuse angle. The filter seating member 23 may be formed under the filter flange 11A of the hose housing 10-1 and extended from the inner ribs 15 formed on the inner wall of the duct housing 10-2. In particular, a plurality of filter seating members 23 may be arranged at predetermined intervals, and increase the dynamic stiffness of the duct housing 10-2 while supporting the front fixing flange 85 during a repair operation of the filter 80.

Therefore, the filter support member 22 and the filter seating member 23 may be positioned on the same line set to a virtual line formed by the filter support angle Ka, and the virtual line may be parallel to the filter virtual axial line y-y of the filter 80. The filter positioning member 24 may include filter holders 24A and 24B that protrude from the left and right inner walls of the duct housing 10-2 to face each other, and the left and right filter holders 24A and 24B hold the left and right side surfaces of the filter frame 83 of the filter 80 supported by the filter support member 22 and the filter seating member 23, thereby preventing the filter 80 from leaning or tilting to the left or right side.

Figure 4:
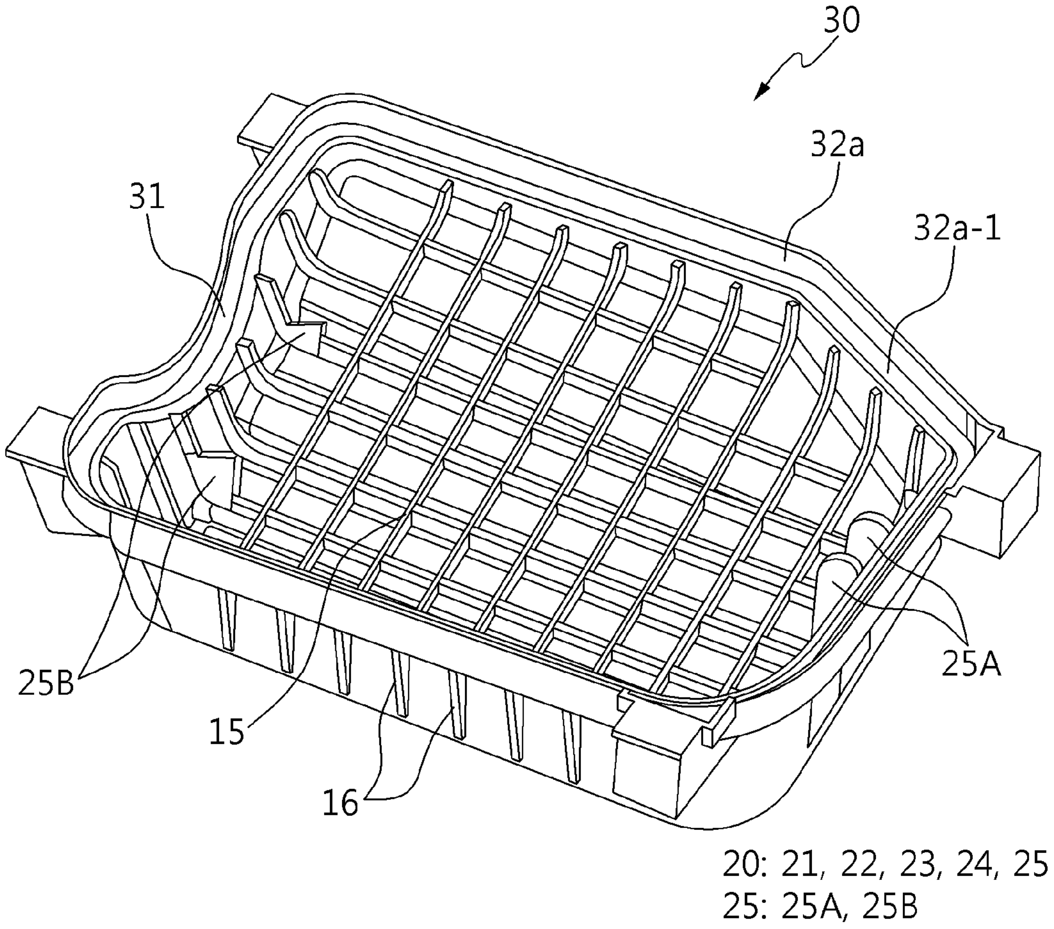
FIG. 4 is a configuration diagram illustrating an air cleaner cover of the air cleaner in accordance with the exemplary embodiment of the present invention.

FIG. 4 is a perspective view of the air cleaner cover 30. Referring to FIG. 4, the filter pushing member 25 may be formed on the inner wall of the air cleaner cover 30 at the front and rear side of the air cleaner cover 30. In particular, the front side of the air cleaner cover 30 in the longitudinal direction may be defined as a formation portion of a hose outlet contact surface 31 pressed against the hose outlet 11 of the hose housing 10-1.

In addition, the filter pushing member 25 may include an adapter pusher 25A that protrudes from the rear inner wall of the air cleaner cover 30 and a filter pusher 25B that protrudes from the front inner wall facing the adapter pusher 25A. Accordingly, the filter adapter 40 may be pushed by the adapter pusher 25A, and the front fixing flange 85 of the filter 80 may be pushed by the filter pusher 25B. Therefore, when the air cleaner cover 30 is clamped by the cover clamp 60, the filter pushing member 25 may prevent a separation of the filter adapter 40 and swaying of the filter 80 through an operation of the air cleaner cover 30 pushing the air cleaner body 10.

Figure 5A:
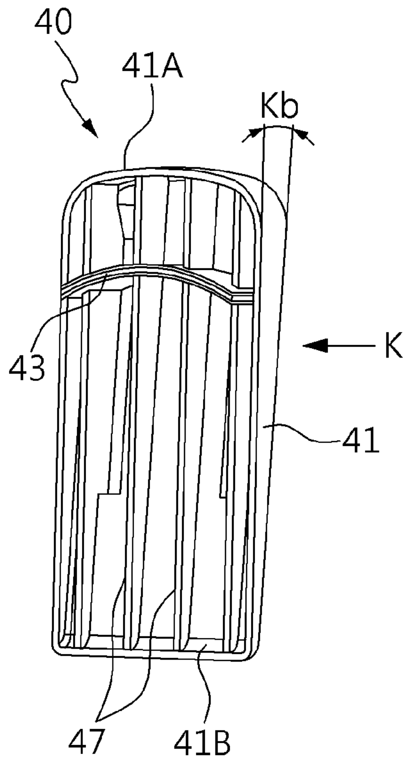
FIGS. 5A-5B are configuration diagrams illustrating an adapter of the air cleaner in accordance with the exemplary embodiment of the present invention.
Figure 5B:
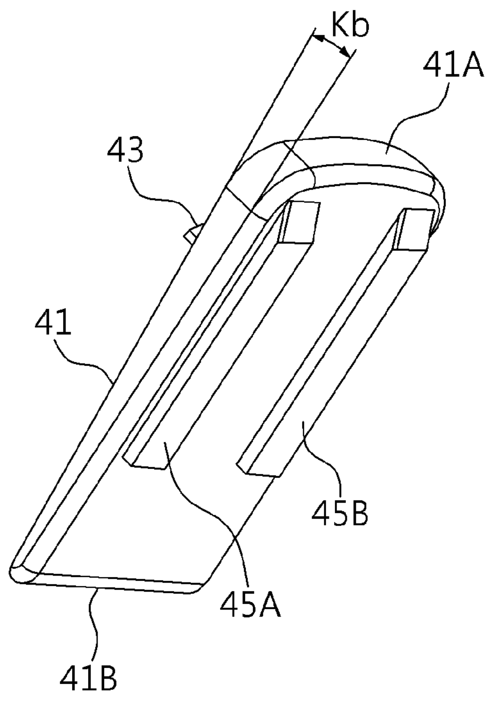

FIGS. 5A-5B are perspective views of the filter adapter 40. Referring to FIGS. 5A-5B, the filter adapter 40 may include an adapter body 41, a filter fixing rib 43, the left and right insertion protrusions 45A and 45B and a plurality of reinforcement ribs 47. The adapter body 41 may have a wedge-shaped upper end 41A and a lower end 41B and the ends 41A and 41B may have different thicknesses. The upper end 41A and the lower end 41B may cover the bottom surface to form a protruding outer edge, and the acute filter wedge angle Kb is formed by a thickness difference between the lower end 41B and the upper end 41A. Therefore, the bottom surface of the adapter body 41 may be divided into an inner bottom surface at which the outer edge is formed by the lower and upper ends 41*b* and 41A and an outer bottom surface at which the outer edge is not formed.

The filter fixing rib 43 may protrude in an arc shape to a predetermined thickness from the inner bottom surface with a gap provided between the upper end 41A and the filter fixing rib 43, and may contact the rear fixing flange 87 of the filter 80. Therefore, the filter fixing rib 43 may prevent the filter 80 from escaping (e.g., unintentionally moving) in the upward direction (or toward the air cleaner cover 30) due to a repulsive force by the filter wedge angle Kb, while the filter adapter 40 is fitted. The left and right insertion protrusions 45A and 45B may be formed to a predetermined thickness on the outer bottom surface of the adapter body 41, and arranged in the longitudinal direction of the filter adapter 40 with a space provided therebetween.

Additionally, the left and right insertion protrusions 45A and 45B may be inserted into the left and right insertion channels 21A-1 and 21A-2 of the adapter guider 21A, respectively, and hold the position of the adapter body 41 during an operation of fitting or separating the filter adapter 40. The plurality of reinforcement ribs 47 may be formed to a predetermined thickness on the inner bottom surface of the adapter body 41, and arranged in the longitudinal direction of the filter adapter 40 with a space provided therebetween. The reinforcement ribs 47 may increase the dynamic stiffness of the filter adapter 40 by strengthening the stiffness of the adapter body 41.

Figure 6:
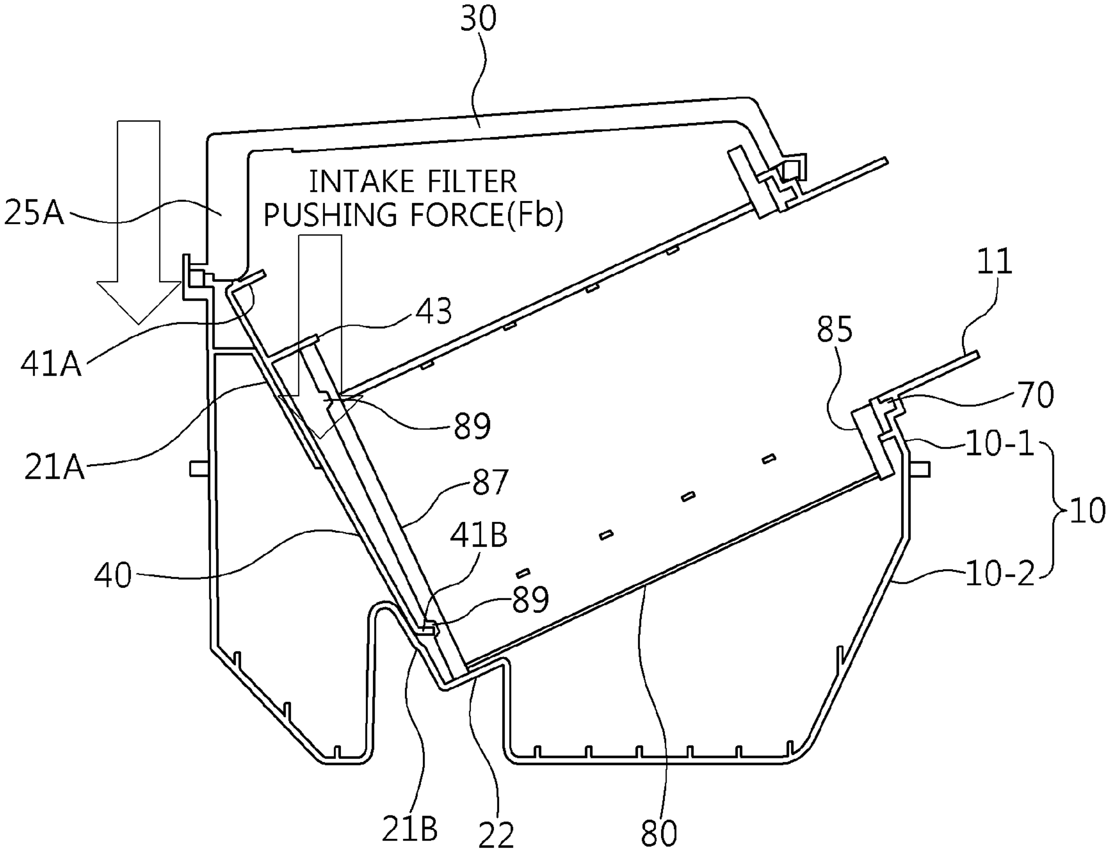
FIG. 6 illustrates a state in which a filter fixing force is formed in accordance with the exemplary embodiment of the present invention.

FIG. 6 illustrates an air cleaner pushing force Fa and an intake filter pushing force Fb which the filter 80 receives when the air cleaner 1 is assembled. The air cleaner pushing force Fa may be formed while the air cleaner cover 30 pushes the air cleaner body 10, and the adapter pusher 25A may be configured to push the upper end of the adapter body 41 through the pushing operation of the air cleaner cover 30, when the air cleaner body 10 and the air cleaner cover 30 are coupled to each other and then clamped by the cover clamp 60. Accordingly, the air cleaner pushing force Fa holds the filter adapter 40 more strongly which prevents a separation of the filter adapter 40 which may occur due to a disturbance applied to the air cleaner 1.

The intake filter pushing force Fb may be formed while the filter fixing rib 43 continuously pushes the rear fixing flange 87, when the adapter body 41 is pushed after the adapter body 41 is inserted into the insertion space of the adapter insertion angle and the filter fixing rib 43 may be brought in contact with the rear fixing flange 87 of the filter 80. Accordingly, the intake filter pushing force Fb may hold the filter adapter more strongly 40, thereby strengthening the operation of preventing a separation of the filter adapter 40. In particular, the lower end 41B of the adapter body 41 may be locked and connected to an arc-shaped groove 89 formed in the rear fixing flange 87 of the filter 80, thereby further strengthening the prevention of a separation of the filter adapter 40.

Figure 7:
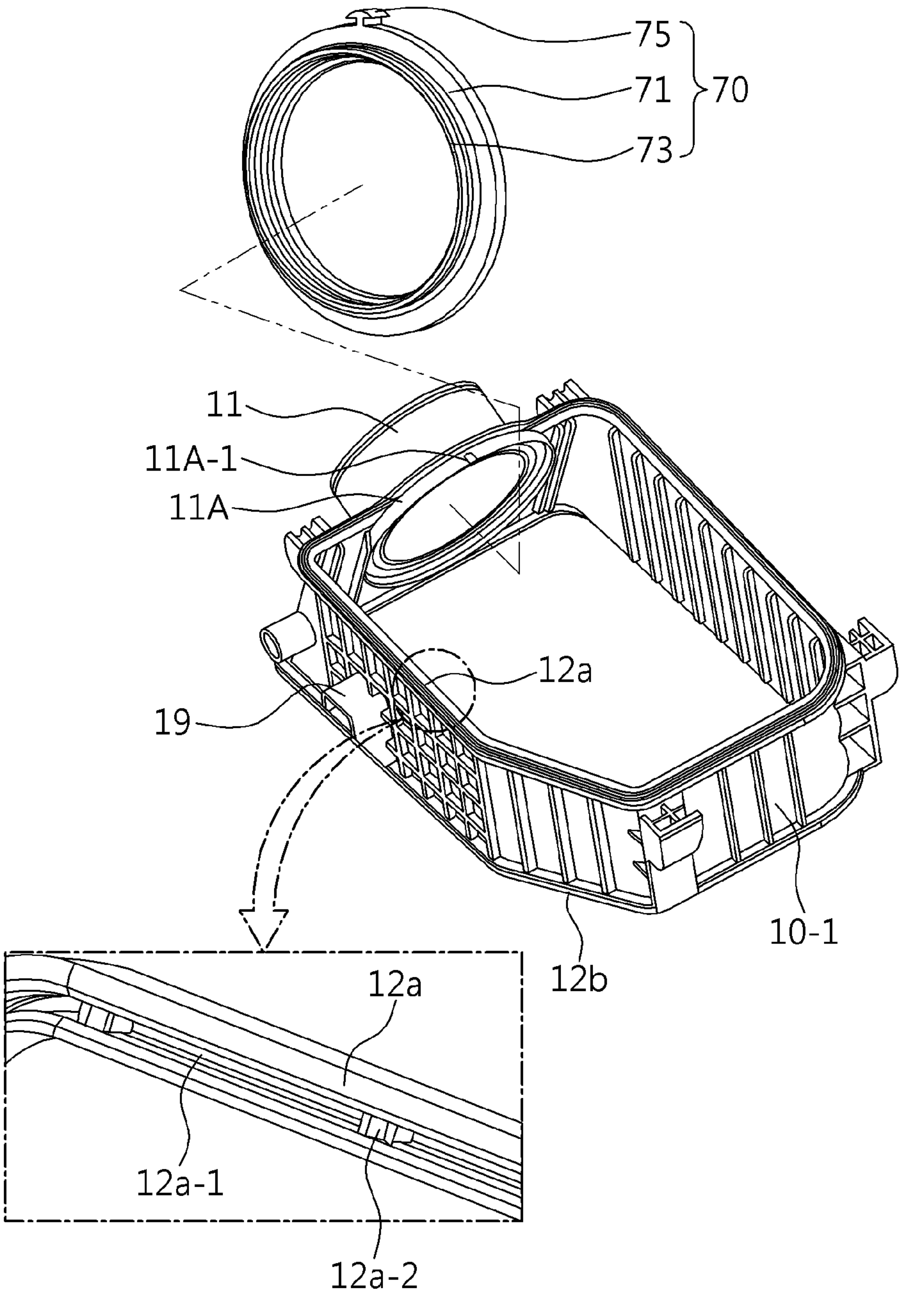
FIG. 7 illustrates an example of a filter strap for sealing the inside of the air cleaner in accordance with the exemplary embodiment of the present invention.

FIG. 7 illustrates the sealing structure of the air cleaner 1 by the housing strap 50 and the filter strap 70. Referring to the sealing structure of the housing strap 50, the strap flange 12*a* of the hose housing 10-1 may include a strap channel 12*a*-1 having a plurality of strap protrusions 12*a*-2 formed at predetermined intervals. Therefore, the housing strap 50 having a predetermined thickness may be seated by fitting the upper portion of the housing strap 50 into the strap channel 32*a*-1 (refer to FIG. 4) formed in the strap flange 32*a* of the air cleaner cover 30 after fitting the lower portion of the housing strap 50 into the strap channel 12*a*-1. Accordingly, the housing strap 50 fitted into the strap channels 12-1 and 32*a*-1 may seal the strap flanges 12*a* and 32*a*, and thus seals the internal space. In particular, the strap protrusions 12*a*-2 may be formed as arrow-shaped fixing protrusions to strengthen a holding force for the housing strap 50.

Referring to the sealing structure of the filter strap 70, a contact flange 85A of the filter 80 and the filter strap 70 may be fitted into a double groove structure of the filter flange 11A, to connect the filter 80 to the hose outlet 11. Accordingly, the filter strap 70 fitted into the double groove structure of the filter flange 11A surrounds the outer circumference of the contact flange 85A, thereby sealing the filter 80. For this structure, the filter strap 70 may include a ring-shaped contact body 71, an insertion flange that produces from one surface of the contact body 71, and an insertion protrusion 75 that protrudes to a predetermined height from the outer circumference of the contact body 71. Therefore, the contact body 71 may be inserted into the outer groove of the double groove structure of the filter flange 11A, the insertion flange 73 may be inserted into the inner groove of the double groove structure of the filter flange 11A, and the insertion protrusion 75 may be inserted into a strap slit 11A-1 formed in the filter flange 11A and may strengthen the fixing force of the filter strap 70.

Figure 8:
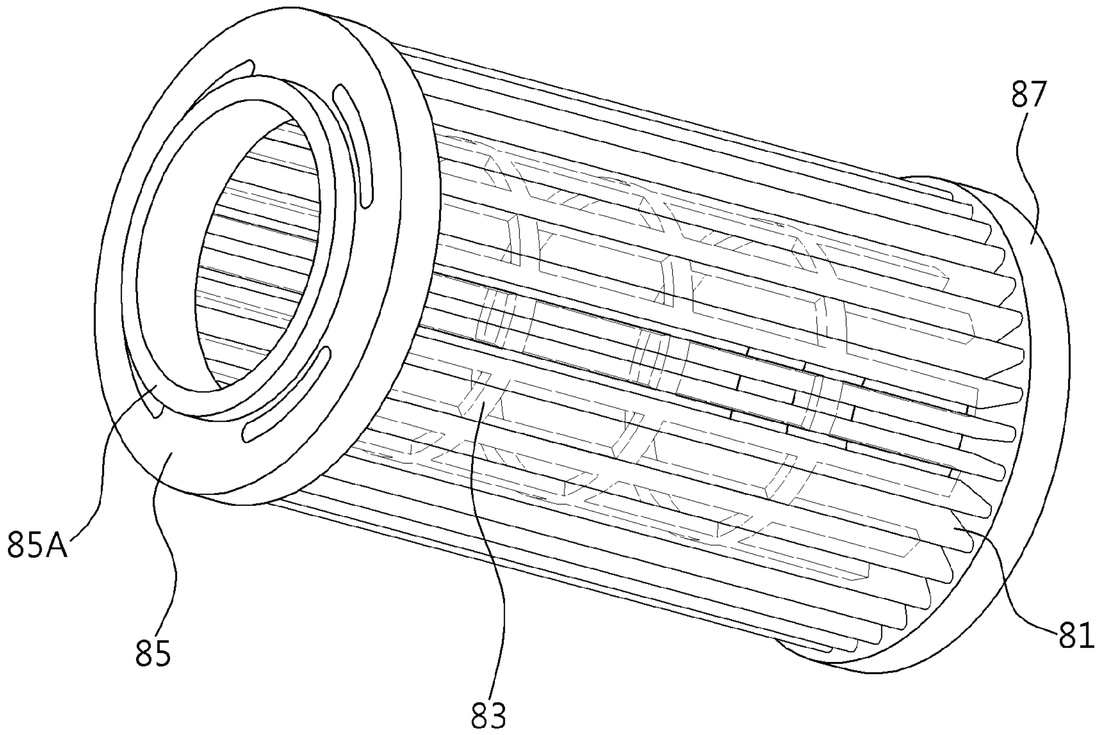
FIG. 8 illustrates an example of a circular filter applied to the air cleaner in accordance with the exemplary embodiment of the present invention.

FIG. 8 illustrates an example of the filter 80. Referring to FIG. 8, the filter 80 may include non-woven fabric 81, the filter frame 83, the contact flange 85A, the front and rear fixing flanges 85 and 87 and the plurality of grooves 89.

Particularly, the non-woven fabric 81 may have a three-layer structure of a bulky layer, an intermediate layer and a dense layer. The non-woven fabric 81 may have a different structure from a filter which is applied to a general intake system to remove foreign matters in the air. Specifically, the inside of the filter 80 may be set to a clean side and the outside of the filter 80 may be set to a dirty side, and thus, the dense layer faces the clean side and the bulky layer faces the dirty side. The filter frame 83 may have a mesh structure to prevent the non-woven fabric 81 from being drawn into the filter frame 83.

Additionally, the front and rear fixing flanges 85 and 87 may be made of hard urethane foam and may be coupled to the front and rear (or top and bottom) of the filter frame 83. The front fixing flange 85 may have an open structure in which a circular aperture is formed to pass air, and the rear fixing flange 87 may have a closed structure to block an air flow. In particular, since the hard urethane foam forming the front and rear fixing flanges 85 and 87 has the same effect as plastics, the hard urethane foam may serve as a frame and also may secure sealing performance. Therefore, the front and rear fixing flanges 85 and 87 formed of hard urethane does not require a separate frame structure, unlike front and rear fixing flanges which are formed of soft urethane and require a separate frame structure to secure fixing performance as well as sealing performance.

Further, the contact flange 85A may protrude while forming a concentric circle with the front fixing flange 85, and may contact the contact body 71 of the filter strap 70, thereby improving the sealing performance of the filter 80. The plurality of grooves 89 may be formed on one surface of each of the front and rear fixing flanges 85 and 87, and may be arranged at predetermined intervals in an arc shape to form a circle as a whole. In particular, the lower end 41B of the adapter body 41 may be locked to the grooves 89 formed on the rear fixing flange 87, to prevent a separation of the filter adapter 40. Therefore, the filter 80 may be formed in a cylindrical shape to have improved pressure absorption and dust collection performance compared to a rectangular filter, and may be mounted at the acute filter assembling angle Kc into the air cleaner 1.

Figure 9:
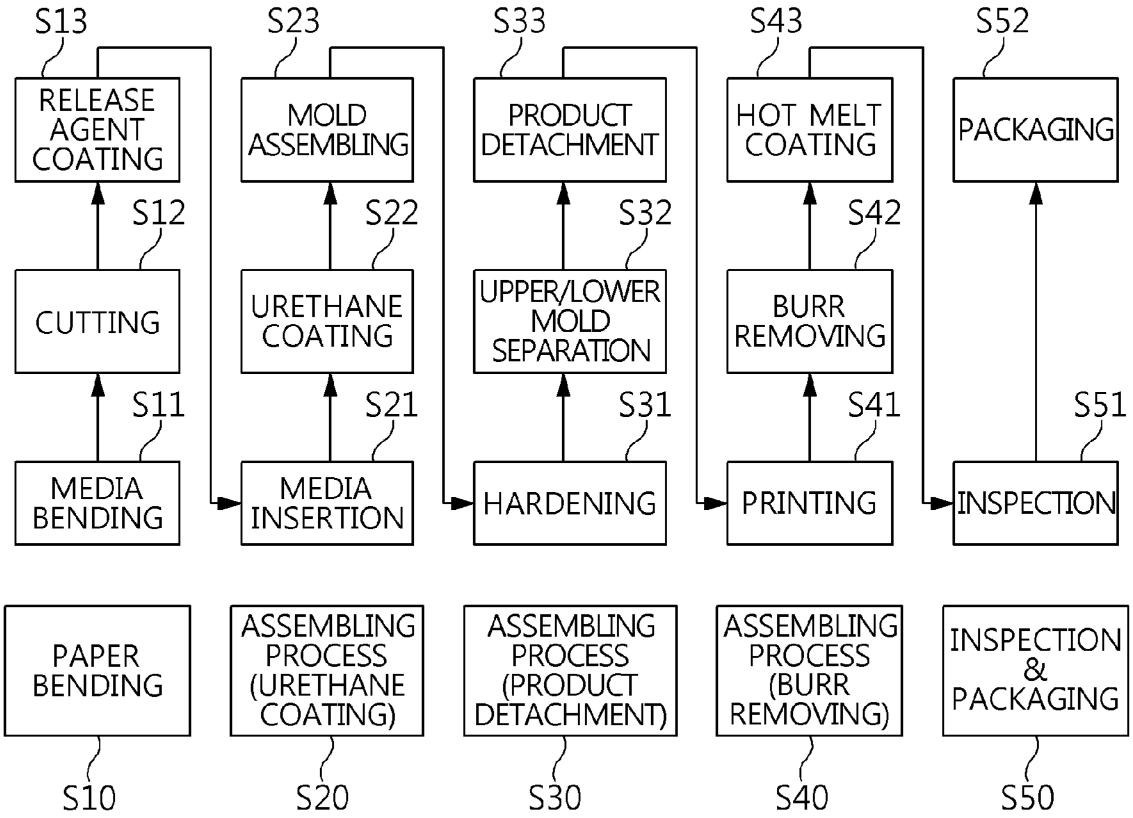
FIG. 9 illustrates an example of a filter manufacturing process in accordance with the exemplary embodiment of the present invention.

FIG. 9 illustrates a filter manufacturing process. Referring to FIG. 9, the filter manufacturing process may include a paper bending process S10, a urethane coating and assembling process S20, a product detachment process S30, a burr removing and assembling process S40 and an inspection and packaging process S50.

Particularly, the paper bending process may include bending media forming non-woven fabric (S11), cutting the bent media according to a design shape (S12), and applying a release agent onto the media cut in the design shape (S13). The urethane coating and assembling process may include inserting the release agent-applied media into the non-woven fabric (S21), coating the inserted media with urethane (S22), and assembling a filter manufacturing mold for the non-woven fabric 81, the filter frame 83 and the front and rear fixing flanges 85 and 87 (S23).

In addition, the product detachment process may include hardening the filter manufacturing mold (S31), separating the filter manufacturing mold into upper and lower molds (S32), and detaching a filter product from the upper and lower molds separated from each other (S33). The burr removing and assembling process may include printing a mark on the manufactured filter (S41), removing burr from the manufacturing filter (S42), and coating the burr-removed filter by hot melt to complete the filter product (S43). The inspection and packaging process may include inspecting the filter product (S51) and packaging the inspected filter product (S52). The respective steps of the filter manufacturing process are merely an example for manufacturing the filter 80 applied to the air cleaner 1. Thus, the filter 80 may be manufactured through manufacturing processes other than the filter manufacturing process of FIG. 9.

Figure 10:
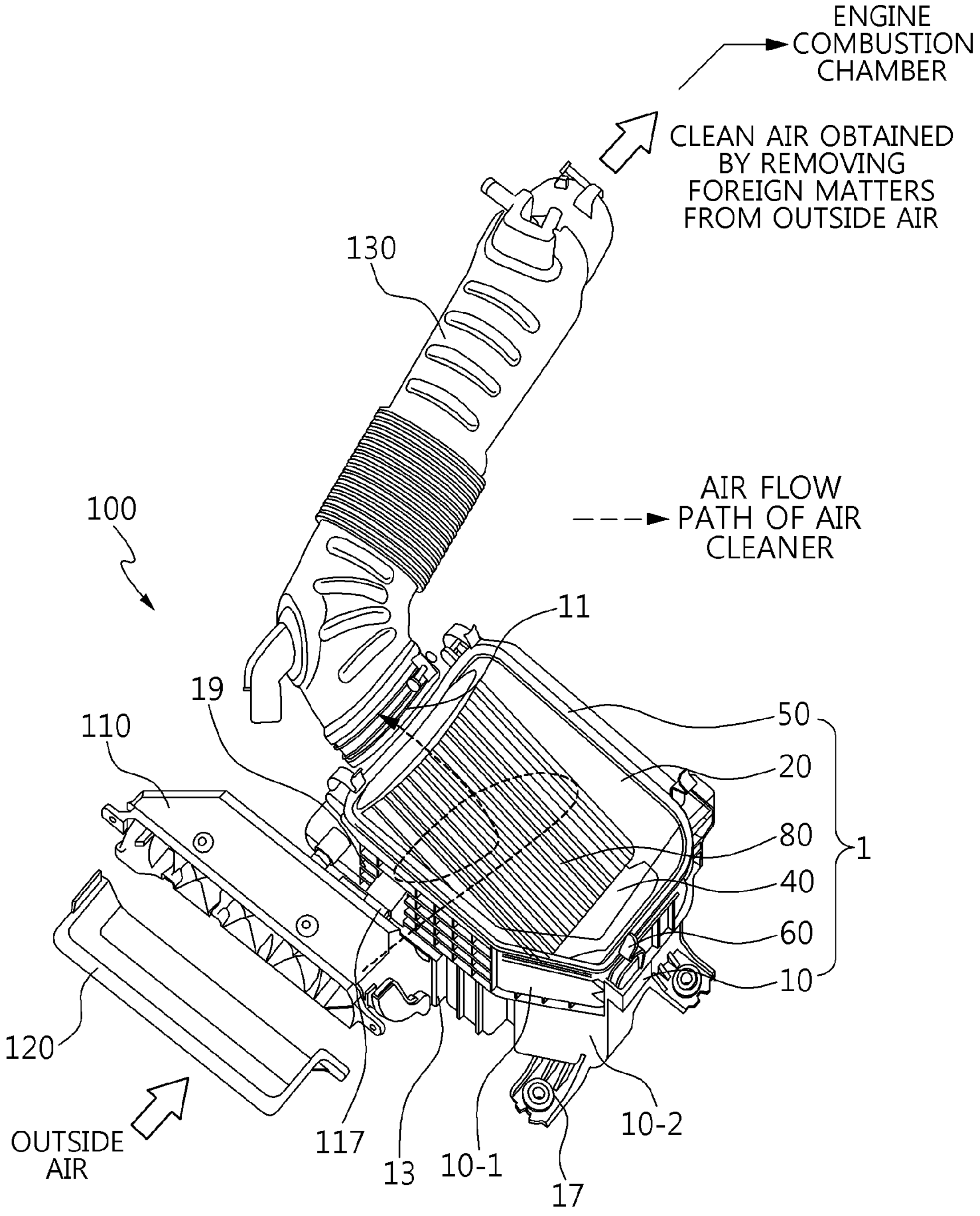
FIG. 10 illustrates an intake system to which the adapter filter fixing type air cleaner in accordance with the exemplary embodiment of the present invention is applied.

FIGS. 10 to 13 illustrate an intake system 100 which supplies clean air into a combustion chamber of an engine (not illustrated) using the adapter filter fixing type air cleaner 1 which removes foreign mattes from outside air and changes the outside air into clean air (e.g., purifies the air). Referring to FIG. 10, the intake system 100 may include the air cleaner 1, an intake duct 110, an intake shield 120 and an intake hose 130.

In particular, the air cleaner 1 has the same structure as the adapter filter fixing type air cleaner 1 described with reference to FIGS. 1 to 9, and changes outside air into clean air by filtering foreign matters from the outside air. However, the air cleaner 1 may further include a connection structure which is coupled to the intake duct 110 through which the outside air may be supplied. For example, the connection structure may include the fixing connector 19 of the hose housing 10-1 and the connecting connector 18 of the duct housing 10-2.

The intake duct 110 may be configured to transmit the outside air passed through the intake shield 120 to the filter 80 of the air cleaner 1, and may be connected and integrated with the air cleaner 1 through the connection structure installed in the air cleaner 1. The intake shield 120 may be configured to receive outside air, and transmit the outside air to the intake duct 110. In particular, the intake shield 120 may primarily block foreign matters (e.g., water/dust/snow) introduced from outside, to transmit only the air to the intake duct 110. The intake hose 130 may operate as a guide to guide the clean air from the air cleaner 1 toward the engine, and thus, the clean air may be supplied to the combustion chamber of the engine. The intake system 100 may be configured to receive the outside air through the intake shield 120, transmit the outside air to the internal space of the air cleaner 1 through the intake duct 110, and change the outside air into clean air by removing foreign matters contained in the outside air through the filter 80. Then, the clean air may be supplied to the combustion chamber of the engine through the intake hose 130.

Figure 11:
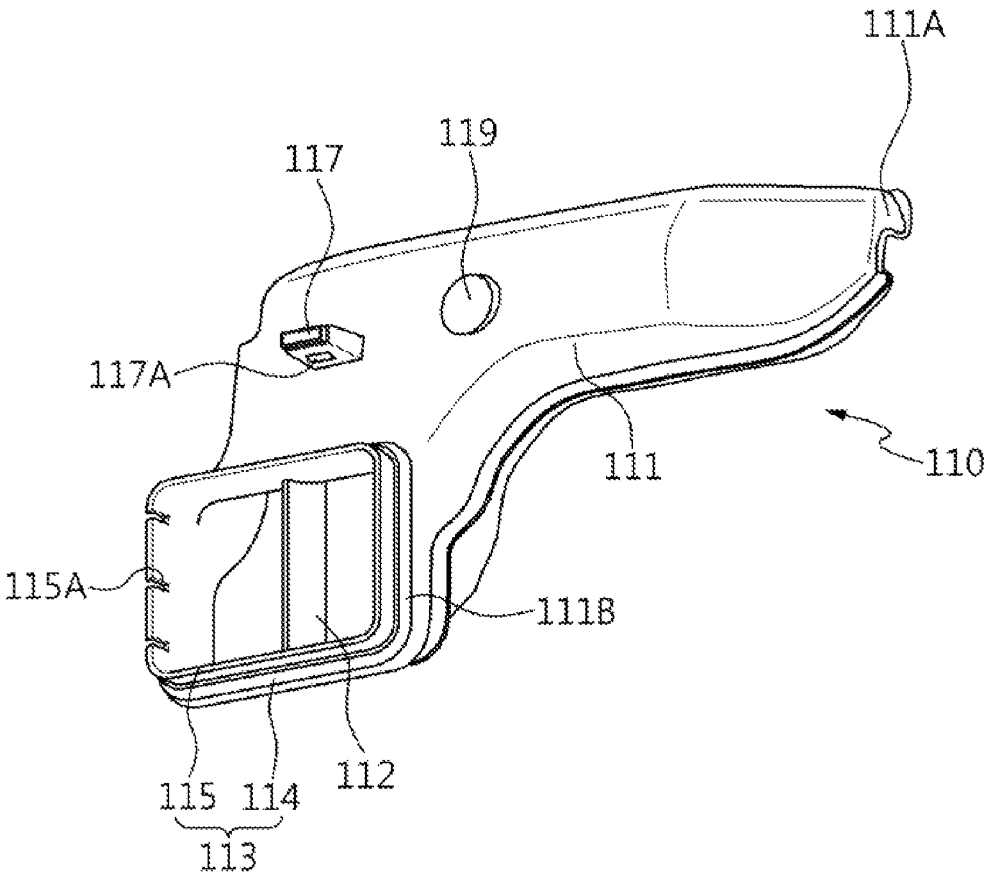
FIG. 11 is a configuration diagram illustrating an intake duct of the intake system in accordance with the exemplary embodiment of the present invention.

Referring to FIG. 11, the intake duct 110 may include an L-shaped duct body 111 having an air inlet 111A into which air may be introduced and an air outlet 111B from which air may be discharged, a partition plate 112 that divides the air outlet 111B into two parts, a connection hook 113 formed as a protrusion edge that surrounds the air outlet 111B, a fixing hook 117 that protrudes from the duct body 111, and a position protrusion 119 that protrudes from the duct body 111. The connection hook 113 may have a rubber seal formed along the edge thereof. Thus, when the connection hook 113 is connected to the duct inlet 13 of the duct housing 10-2, the internal space may be sealed by the rubber seal.

The connection hook 113 may include a hook body 114 that forms the protrusion edge covered by the rubber seal and a hook end 115 formed in an inclined protrusion shape (arrowhead shape) at the leading end of the hook body 114.

In particular, the hook body 114 may include a separation slit 115A which divides the hook end 115 into a plurality of parts, such that the hook end 115 has an improved elastic force. The fixing hook 117 may include a protrusion body and a hook protrusion 117A. The protrusion body may protrude from the duct body 111 in the same direction as the protruding direction of the connection hook 113, and the hook protrusion 117A may be formed on one surface of the protrusion body and have an inclined protrusion shape (e.g., an arrowhead shape). The position protrusion 119 may be formed at a position separated from the fixing hook 117, and may protrude from the duct body 111 in the same direction as the protrusion direction of the fixing hook 117.

Figure 12:
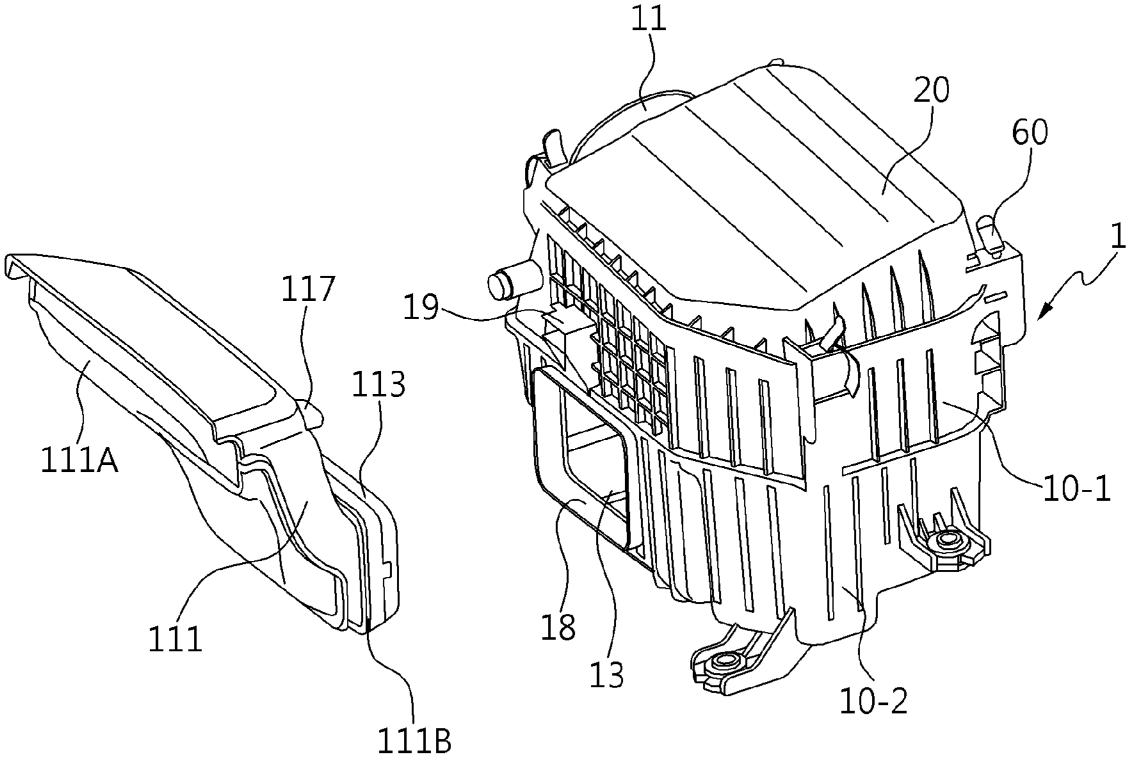
FIG. 12 is an assembled view of the intake duct and the air cleaner in accordance with the exemplary embodiment of the present invention.

FIG. 12 illustrates an assembling process of the intake duct 110 and the air cleaner 1. Referring to FIG. 12, the assembling process may be performed by pushing the connection hook 113 of the intake duct 110 into the duct inlet 13 of the duct housing 10-2 while pushing the fixing hook 117 of the intake duct 110 into the fixing connector 19 of the hose housing 10-1. Then, the connection hook 113 may be fitted and connected to the connecting connector 18 that surrounds the duct inlet 13, and the fixing hook 117 may be fitted and coupled to the fixing connector 19 of the hose housing 10-1.

In particular, the position protrusion 119 of the intake duct 110 may be brought in contact with a push prevention pad (e.g., rubber) installed on the outer surface of the housing body of the hose housing 10-1, to prevent the intake duct 110 from being pushed from the air cleaner 1 when the intake duct 110 is assembled. Furthermore, the rubber seal (not illustrated) that covers the hook body 114 of the connection hook 113 may be brought in contact with the connecting connector 18, thereby sealing the duct inlet 13 through the air is introduced.

Figure 13:
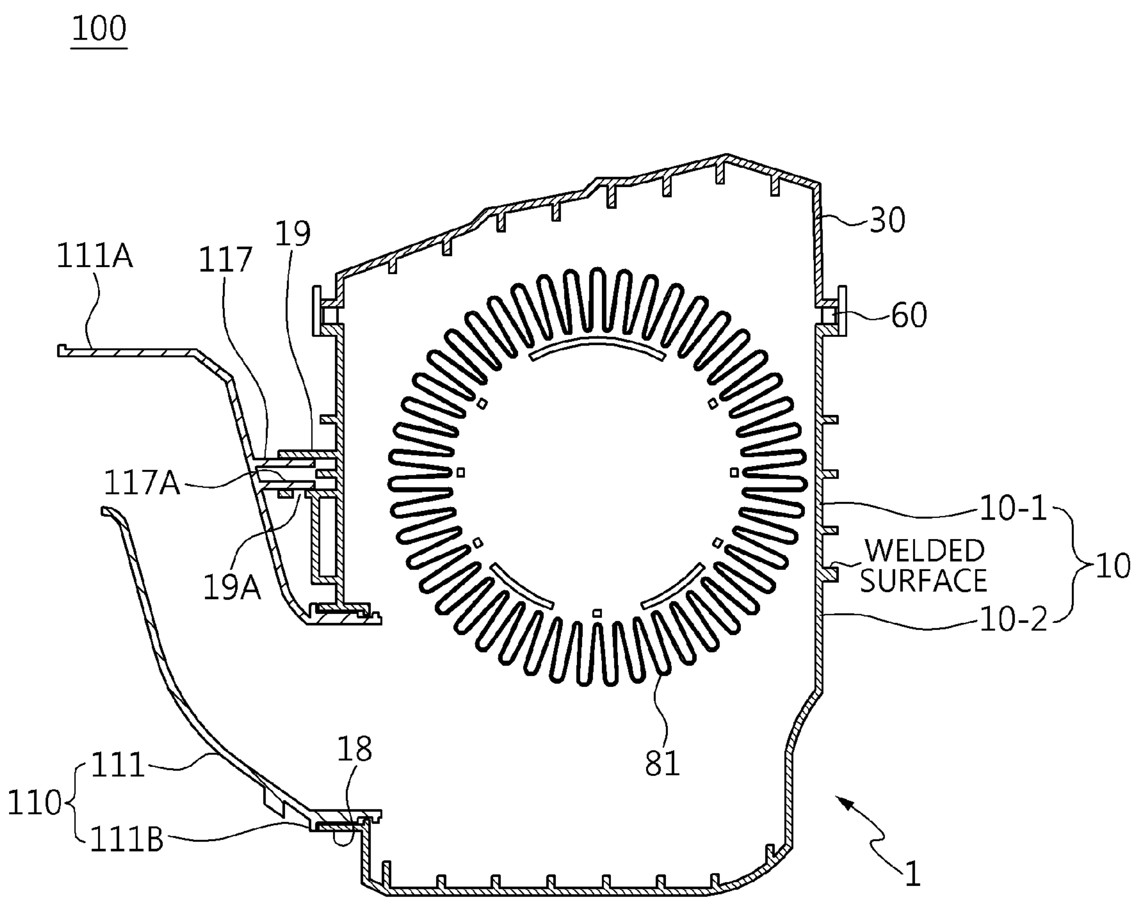
FIG. 13 is an assembled cross-sectional view of the intake duct and the air cleaner in accordance with the exemplary embodiment of the present invention.

FIG. 13 is an assembled cross-sectional view of the intake duct 110 and the air cleaner 1, illustrating the connection between the connection hook 113 and the connecting connector 18 and the connection between the fixing hook 117 and the fixing connector 19. The connection between the connection hook 113 and the connecting connector 18 may be achieved through an operation of fitting the hook body 114 into the connecting connector 18 to bring the hook body 114 in contact with the inner surface of the connecting connector 18, and locking the hook end 115 of the hook body 114 to the locking end 18A of the connecting connector 18. As a result, the hook end 115 and the locking end 18A maintain the state in which the intake duct 110 is fixed to the hose housing 10-1.

The connection between the fixing hook 117 and the fixing connector 19 may be achieved through an operation of fitting the fixing hook 117 into the fixing connector 19 to bring the fixing hook 117 in contact with the inner surface of the fixing connector 19, and locking the hook protrusion 117A of the fixing hook 117 to the locking groove 19A formed at one surface of the fixing connector 19. As a result, the hook protrusion 117A and the locking groove 19A maintain the state in which the intake duct 110 is fixed to the hose housing 10-1.

As described above, the intake system 100 in accordance with the present exemplary embodiment employs the adapter filter fixing type air cleaner 1 including the filter 90 for purifying introduced air, the air cleaner body 10 and the air cleaner cover 30 forming the internal space in which the filter 90 is mounted in an upward inclined arrangement, the filter fixer 20 for blocking swaying of the filter in the internal space through the filter fixing force, and the filter adapter 40 forming the filter fixing force by pressing the filter 80 in the internal space. Thus, the intake system 100 may provide convenience since the filter 80 may be mounted and detached through the insertion and separation operation of the filter adapter 40. In particular, since a circular filter which may simplify the structure and reduce the weight, mold cost and manufacturing cost is used as the filter 80, the intake system 100 may be properly used for a high-performance vehicle which requires a larger penetration area and higher pressure absorption performance.

In accordance with the exemplary embodiments of the present invention, the intake system including the air clear having the circular filter mounted/detached through the adapter filter fixing structure has the following effects. First, since the air cleaner includes the circular filter, the pressure absorption performance may be improved by 1 kPa or more, compared to an air cleaner that includes a square filter. Second, since the air cleaner may remove a bolting operation unlike the bolt fixing type air cleaner, a repair operation may be performed more easily. Third, since the bolt and nut of the bolt fixing type air cleaner or the support and fastening structure for the filter and spring of the spring fixing type air cleaner may be removed, the manufacturing cost may be reduced. Fourth, since the separate structures applied to the upper and lower ends of the circular filter in the bolt fixing type air cleaner or the spring fixing type air cleaner and the nut insertion at the air cleaner may be removed, the productivity may be improved. Fifth, since the circular filter having a larger penetration area and higher pressure absorption performance than a square filter is applied, the intake system may satisfy the requirements for a high performance vehicle.

While the present invention has been described with respect to the specific exemplary embodiments, it will be apparent to those skilled in the art that various changes and modifications may be made without departing from the spirit and scope of the invention as defined in the following claims.

What is claimed is:

1. An air cleaner, comprising an air cleaner body and air cleaner cover coupled to each other to form an internal space for mounting a filter, and clamped to or separated from each other through a cover clamp, the filter configured to purify air introduced through a duct inlet into air which is to be discharged through a hose outlet;

a filter fixer disposed in the internal space to seat the filter therein, and generating a filter holding force to block swaying of the filter in the internal space; and a filter adapter mounted into or detached from the internal space, and inserted into the internal space to generate a filter fixing force for fixing the filter in the internal space, wherein the filter is a circular filter having a cylindrical frame structure, wherein the filter is positioned in the internal space of the air cleaner body and the air cleaner cover with an upward inclination arrangement in which a front side of the filter is raised approximately to the hose outlet and a rear side of the filter is lowered toward the duct inlet, wherein the filter fixer includes an adapter guide member formed at the rear side of the filter to guide an insertion path of the filter adapter, and a filter holding member formed at the front and rear sides and left and right sides of the filter to generate the filter holding force, wherein the filter adapter is fitted to the adapter guide member and generates the filter fixing force, wherein the filter fixer supports the filter through the filter holding force to maintain the upward inclination arrangement in the internal space, and the filter adapter generates the filter fixing force at the rear side of the filter, and wherein the adapter guide member is inclined to an inner wall of the air cleaner body and formed on the inner wall of the air cleaner body.

2. The air cleaner of claim 1, wherein the filter is formed of hard urethane.

3. The air cleaner of claim 1, wherein the filter adapter is mounted into or separated from the internal space of the air cleaner body to be coupled with the air cleaner cover.

4. The air cleaner of claim 1, wherein the filter adapter is formed in a wedge shape to generate the filter fixing force for pressing the filter in the internal space.

5. The air cleaner of claim 1, wherein the filter holding member includes:

a filter support member positioned at the rear side of the filter;

a filter seating member positioned at the front side of the filter; and a filter positioning member positioned at the left and right of the filter, wherein the filter support member, the filter seating member, and the filter positioning member are formed in the air cleaner body.

6. The air cleaner of claim 5, wherein the filter support member protrudes from the bottom surface of the internal space, the filter seating member protrudes from the inner wall of the internal space, and the filter support member and the filter seating member support the rear and front sides of the filter in the upward inclination arrangement.

7. The air cleaner of claim 5, wherein the filter positioning member includes:

left and right filter holders that protrude from the inner wall of the internal space to face each other, wherein the left and right filter holders support the left and right sides of the filter in the upward inclination arrangement.

8. The air cleaner of claim 5, wherein the filter holding member further includes:

a filter pushing member to generate the filter holding force at the top of the filter, wherein the filter pushing member is formed on the air cleaner cover.

9. The air cleaner of claim 8, wherein the filter pushing member includes:

an adapter pusher and a filter pusher that protrude from the inner wall of the air cleaner cover to face each other, wherein the adapter pusher pushes the upper portion of the filter adapter fitted into the adapter guide member, and wherein the filter pusher is formed at the front side of the filter and pushes the upper portion of the filter.

10. The air cleaner of claim 1, wherein the filter adapter includes:

an adapter body fitted into the adapter guide member and generating the filter fixing force to press a rear surface of the filter; and a filter fixing rib that protrudes from the adapter body and is fitted into the adapter guide member to be in contact with the rear surface of the filter.

11. The air cleaner of claim 10, wherein the filter adapter includes:

left and right insertion protrusions that protrude from the adapter body with a space provided therebetween, wherein the left and right insertion protrusions are inserted into left and right insertion channels of the adapter guide member and hold the position of the adapter body.

12. The air cleaner of claim 1, wherein a filter flange protrudes from the inner wall of the internal space at a connection between the filter and the hose outlet to connect the filter, and a filter strap is fitted to the filter flange to seal the filter flange.

13. The air cleaner of claim 1, wherein a housing strap seals the coupling surface between the air cleaner body and the air cleaner cover to seal the internal space, and the coupling surface includes strap channels to which the housing strap is fitted.

14. The air cleaner of claim 1, wherein the air cleaner body includes:

a hose housing and a duct housing that are welded to form the internal space, wherein the hose housing includes the hose outlet and is coupled to the air cleaner cover, and wherein the duct housing includes the duct inlet and a bottom surface.

15. An intake system, comprising:

an air cleaner including:

an air cleaner body having a hose housing and a duct housing that are coupled to form an internal space, wherein the hose housing includes a hose outlet from which clean air is discharged and the duct housing includes a duct inlet into which outside air is introduced;

an air cleaner cover coupled to the hose housing to form the internal space;

a cylindrical filter mounted in the internal space with an upward inclination arrangement in which a front side of the filter is raised approximately to the hose outlet and a rear side of the filter is lowered, and the filter is configured to change the outside air into the clean air by filtering foreign matters of the outside air;

a filter fixer that generates a filter holding force to support the filter in the internal space;

a filter adapter that generates a filter fixing force to fix the filter in the internal space;

a housing strap installed on a coupling surface between the air cleaner body and the air cleaner cover to seal the internal space;

a cover clamp configured to clamp the air cleaner body with the air cleaner cover; and a filter strap installed at a connection between the filter and the hose housing to seal the filter, wherein the filter fixer includes an adapter guide member formed at the rear side of the filter to guide an insertion path of the filter adapter, and a filter holding member formed at the front and rear sides and left and right sides of the filter to generate the filter holding force, wherein the filter adapter is fitted to the adapter guide member and generates the filter fixing force, wherein the filter fixer supports the filter through the filter holding force to maintain the upward inclination arrangement in the internal space, and the filter adapter generates the filter fixing force at the rear side of the filter, and wherein the adapter guide member is inclined to an inner wall of the air cleaner body and formed on the inner wall of the air cleaner body;

an intake duct through which the outside air flows;

an intake shield configured to filter foreign matters of the outside air flowing through the intake duct; and an intake hose through which the clean air flows from the intake shield to an engine.

16. The intake system of claim 15, wherein the intake duct includes:

a duct body through which the outside air flows, wherein the duct body includes a connection hook from which the outside air escapes, and wherein the connection hook is fitted to a connecting connector that surrounds the duct inlet and fixes a connection between the intake duct and the duct housing.

17. The air cleaner of claim 15, wherein the intake duct includes a fixing hook formed on the duct body through which the outside air flows, and the fixing hook is fitted to a position protrusion formed on the hose housing and fixes a connection between the intake duct and the hose housing.

* * * * *